United States Patent [19]

Kilpela

[11] Patent Number: 4,505,663

[45] Date of Patent: Mar. 19, 1985

[54] FLAKE FEEDER ALIGNER INCLUDING RECIPROCATING BAFFLES

[75] Inventor: Tauno B. Kilpela, Atlantic Mine, Mich.

[73] Assignee: Board of Control of Michigan Technological University, Houghton, Mich.

[21] Appl. No.: 383,833

[22] Filed: Jun. 1, 1982

[51] Int. Cl.³ .............................................. B29C 15/00

[52] U.S. Cl. ..................................... 425/363; 198/382

[58] Field of Search ........................ 198/392, 532, 569; 425/81.1, 82.1, 83.1; 264/24, 108

[56] References Cited

U.S. PATENT DOCUMENTS 3,478,861 11/1969 Elmendorf .

3,551,250 12/1970 Paoletti .......................... 425/81.1 X 3,692,612 9/1972 Carlsson et al. .

4,295,557 10/1981 Etzold et al. ........................ 198/382

*Primary Examiner*—Joseph E. Valenza

*Assistant Examiner*—Dennis Williamson

[57] ABSTRACT

Apparatus is described for forming a loosely felted mat of elongated wood flakes, the wood flakes being aligned in parallel relation and parallel to the longitudinal direction of the mat. The apparatus includes a former for depositing wood flakes on a support surface in a uniformly dispersed, loosely felted relation, and a plurality of vertically oriented baffles positioned below the former and in mutually parallel alignment. The baffles include a first set and a second set with respective ones of the second set of baffles being positioned between respective ones of the baffles of the first set. The baffles of the second set are reciprocated in the direction of the mat to cause flakes lying across the baffles to be aligned with the longitudinal direction of the mat.

3 Claims, 3 Drawing Figures

FLAKE FEEDER ALIGNER INCLUDING RECIPROCATING BAFFLES

FIELD OF THE INVENTION

The invention relates to apparatus for use in making compressed wood particle products and more particularly to apparatus for use in forming loosely felted mats of wood flakes, the mats adapted to be compressed to thereby form composite wood products.

BACKGROUND PRIOR ART

As set forth in Lund et al. U.S. Pat. No. 4,241,133, issued Dec. 23, 1980 and assigned to the assignee of the present invention, it has been found to be desirable in the construction of compressed or composite wood particle products to employ wood flakes which are very thin and which have a length at least several times their width and to align the wood flakes in mutually parallel alignment and in alignment with the longitudinal axis of the product being produced. This produces a product having substantially improved strength characteristics in the direction of alignment of the wood flakes. The production of such compressed wood products formed from an assembly of wood particles first requires the formation of a loosely felted mat of wood particles. The mat is then compressed to form a densified panel or board. One problem encountered in forming the loosely felted mat is that the alignment or orientation of the elongated wood flakes is made difficult because the wood flakes, which are very light and comparatively fragile, have to be handled en masse, and this has resulted in the clogging of the known machines that were tried for this purpose. Additionally, it has been difficult to produce mats of uniform thickness using prior art machines. Another problem in connection with handling and orienting the wood flakes has been that the flakes tend to be randomly oriented as they fall onto the mat if they are not held in alignment as they are deposited.

Examples of prior art attempts to design suitable apparatus for forming mats of aligned wood particles are set forth in the Elmendorf U.S. Pat. No. 3,478,861, issued Nov. 18, 1979; the Elmendorf U.S. Pat. No. 3,202,743, issued Aug. 24, 1965; the Turner et al. U.S. Pat. No. 3,721,329, issued Mar. 30, 1973; the Urmanov U.S. Pat. No. 3,963,400, issued June 15, 1976; and Canadian Pat. No. 597,941, issued May 10, 1960.

Attention is also directed to the Hostettler U.S. Pat. No. 3,226,764, issued June 4, 1966; the Hostettler U.S. Pat. No. 3,070,838, issued Jan. 1, 1963; the Carlsson et al. U.S. Pat. No. 3,692,612; the Paerels et al. U.S. Pat. No. 3,372,217, issued Mar. 5, 1968; the Axer et al. U.S. Pat. No. 3,824,058, issued July 16, 1974; and the Chapman U.S. Pat. No. 2,992,152, issued July 11, 1961.

SUMMARY OF THE INVENTION

The present invention relates to apparatus including improved means for aligning the wood flakes being deposited by a former during the formation of a loosely felted mat of the type used in forming compressed wood products.

More particularly, the invention includes an apparatus for forming a loosely felted mat of elongated wood flakes, the wood flakes being aligned in parallel relation and parallel to the longitudinal direction of the mat. The apparatus comprises means positioned above a support surface and for depositing wood flakes onto the support surface in a uniformly dispersed, loosely felted relation, and means between the support surface and the depositing means for aligning the elongated wood flakes in mutually parallel alignment as the wood flakes are deposited on the support surface. The aligning means includes a first set of planar baffles, means for supporting the baffles of the first set in spaced parallel relation and defining vertical planes, a second set of planar baffles, means for supporting the baffles of the second set in spaced parallel relation and defining vertical planes and with respective ones of the second set of baffles being positioned between respective ones of the baffles of the first set. Means are also provided for causing reciprocal movement of the baffles of the second set with respect to the baffles of the first set and in a direction parallel to the planes defined by the baffles.

In one embodiment of the invention the apparatus further includes mat compression rollers movable in the direction of the planes defined by the baffles, the rollers being adapted to roll along the mat to precompress the wood flakes of the mat.

One of the features of the invention is the provision of a plurality of projections integrally joined to the upper edges of the baffles and extending upwardly therefrom, the projections being spaced apart along the length of the baffles and being adapted to engage the wood flakes as the baffles move.

In one embodiment of the invention the means for supporting the first set of baffles includes a rectangular frame, the frame defining a central opening, and the means for supporting the second set of baffles includes a second rectangular frame positioned in the central opening of the first frame, the second frame being reciprocably movable in the opening.

Another feature of the invention is the provision of a third set of planar vertical baffles, means for supporting the third set of baffles in spaced parallel relation and defining vertical planes and with respective ones of the baffles of the third set being positioned between baffles of the first set and of the second set and the provision of means for causing reciprocal movement of the baffles of the third set in a direction parallel to the planes defined by the baffles of the third set and in a direction opposite to the movement of the baffles of the second set of baffles.

In one embodiment of the invention the second frame includes a central opening, the means supporting the third set of baffles includes a rectangular frame housed in that central opening in the second frame, and the third frame includes a central opening housing the baffles.

In one embodiment of the invention the means for causing reciprocal movement of the second set of baffles and the means for causing reciprocal movement of the third set of baffles include means for causing reciprocal movement of the second frame and the third frame simultaneously in opposite directions.

Various other features and advantages of the invention will be apparent by reference to the following description of a preferred embodiment, from the claims and from the drawings.

Figure 1:
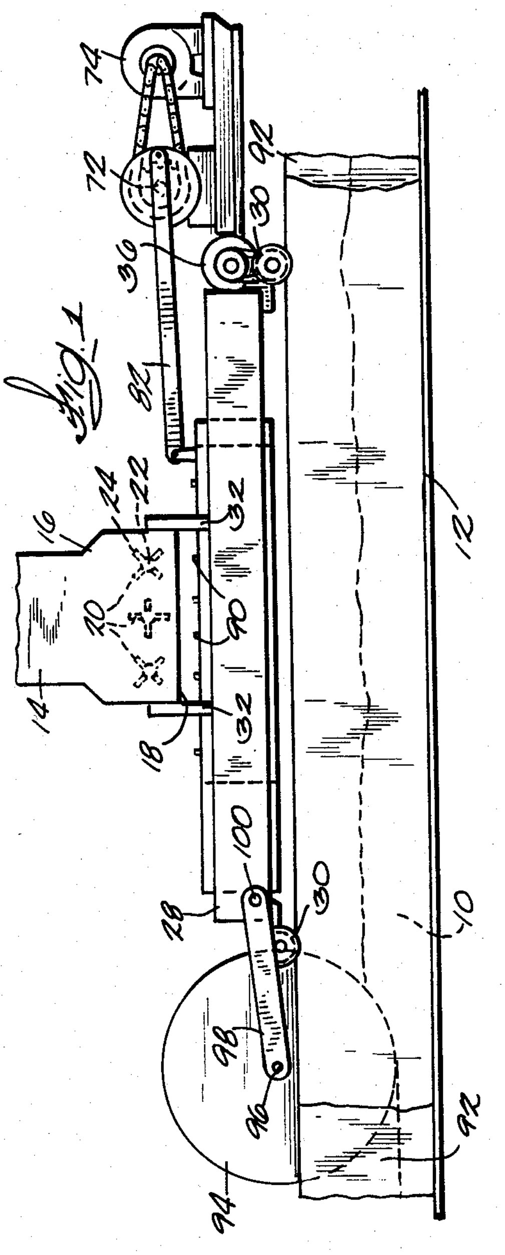
FIG. 1 is an elevation view of an apparatus embodying the invention.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is an apparatus embodying the present invention and for use in forming a loosely felted mat 10 of wood flakes, the mat being adapted to be compressed to thereby form a densified composite wood product. More particularly, the apparatus illustrated in FIG. 1 includes a means providing a supporting surface 12 adapted to support the loosely felted mat 10 of aligned wood flakes. The supporting surface 12 is adapted to receive wood flakes dispensed from a flake former 14 and is adapted to support the flakes as the mat is gradually built up. When the mat is built up to a suitable thickness, it may be conveyed to a press apparatus (not shown) to be compressed and to form a composite wood product.

While in the illustrated construction the means for depositing the wood flakes on the mat is shown as being comprised by the former 14, it should be understood that in other arrangements, various other means for depositing wood flakes could be employed. For example, any conventional apparatus employed to deposit wood chips as in the manufacture of chipboard or particleboard could also be employed with the structure of the invention. In the illustrated construction, the former 14 includes a housing 16 comprising a hopper adapted to contain a quantity of furnish comprised of wood flakes mixed with a suitable quantity of binder. An opening 18 is provided in the bottom of the hopper 16 and the flakes of the furnish are intended to drop through the opening 18 and to be disbursed in a uniform pattern. A plurality of rotatable picker rolls 20 are housed in the bottom of the hopper 16 and function to control the amount of furnish deposited by the former and to cause any clumps of flakes to be broken up so that the wood flakes are evenly disbursed. As is conventional, the picker rolls 20 each include a central rotatable shaft 22 and a plurality of pins 24 extending radially outwardly from the central rotatable shaft 22. Means are also provided for causing the shaft 22 to be rotatably driven such that the picker rolls 20 will properly break up any clumps of wood flakes and such that they will evenly disburse the wood flakes over the supporting surface 12.

Means are also provided for supporting the former 14 for reciprocating movement back and forth along the length of the supporting surface 12 so that as the flakes are disbursed by the former 14, they will be cast in an evenly felted and uniform relationship onto the supporting suface. The former 14 will reciprocate back and forth along the length of the supporting surface to cause the mat to build up to the desired thickness. While the means for supporting the former 14 for such reciprocal movement can have various constructions, in the illustrated arrangement the apparatus includes a pair of tracks 26 (FIG. 2) positioned on opposite sides of the elongated supporting surface 12, th tracks 26 being positioned above the supporting surface. A frame 28 supported on wheels 30 rides on the tracks, and a rigid structure 32 supported by the frame 28 is provided for supporting the former 14. Means are also provided for causing the frame 28 to be driven in a reciprocating relation back and forth along the length of the tracks whereby flakes are disbursed along the length of the mat. While the drive means can have various constructions, in the illustrated arrangement it includes an electric motor 36 (FIG. 2) drivingly connected to one of the wheels 30 for driving that wheel.

As set forth in the U.S. Lund et al. patent referred to above, in the construction of an elongated structural member of the type described there, for best results the wood flakes employed in making the composite wood product should have an average length of about 0.5 inch to about 3.5 inches, preferably about 1 inch to about 2 inches, and an average thickness of about 0.01 to 0.05 inch, preferably about 0.015 to about 0.025 inch and most preferably about 0.02 inch. Flakes longer than 3.5 inches tend to curl which hinders proper alignment during the mat formation, and it is difficult to insure that flakes shorter than about 0.5 inch do not become aligned with their grain direction crosswise to the longitudinal direction of the product being formed. Flakes thinner than about 0.01 inch tend to require excessive amounts of binder to obtain adequate bonding, and flakes thicker than about 0.05 inch are relatively stiff and tend to require excessive compression to obtain the desired intimate contact therebetween. To facilitate proper alignment of the flakes in mutually parallel relation and parallel to the longitudinal axis of the mat being formed, the flakes should have a length which is several times their width, preferably about 4 to about 10 times. Using this constraint as a guide, the average width of the flakes generally should be about 0.1 to about 0.5 inch.

A suitable furnish is formed by introducing flakes of the size described above into a conventional blender wherein predetermined amounts of a binder are applied to the flakes as they are tumbled or agitated in the blender. Suitable binders include those used in the manufacture of particleboard and similar pressed fiberous products and other chemical bonding systems. Resinous particleboard binders presently are preferred. Representative examples of suitable binders include thermosetting resins such as phenol-formaldehyde, resorcinol-formaldehyde, melamineformaldehyde, urea-formaldehyde, urea-furfuryl and condensed furfuryl alcohol resins, and organic polyisocyanates including those curable at room temperatures, either alone or combined with urea or melamine-formaldehyde resins.

As also set forth in the Lund et al. patent, it is further advantageous in many applications that the elongated wood flakes in the composite product be oriented such that substantially all of the elongated wood flakes are aligned in substantially parallel relation and with their longitudinal axes substantially parallel to the longitudinal axis of the elongated mat being formed.

Accordingly, means are provided by the present invention for causing flakes being deposited by the former 14 to be aligned as they are dropped from the former. The means for aligning the flakes includes a plurality of baffles 40, positioned above the supporting surface, the baffles 40, each defining a vertical plane and the baffles being positioned in closely adjacent side-by-side parallel relation, each of the baffles 40 being aligned with the longitudinal direction of the mat 10. While the baffles 40 can have various constructions, in the illustrated arrangement they comprise thin planar sheet metal plates positioned so as to define vertical planes. The plates are elongated and their longitudinal axes are positioned generally horizontally and in the longitudinal direction of the mat 10.

In operation of the flake aligning device, the wood flakes from the former 14 are intended to drop between the parallel baffles 40 and to be aligned by the baffles 40 such that substantially all of the elongated flakes are aligned with their axes being substantially parallel to one another and parallel to the longitudinal axis of the mat 10 being formed. Such alignment of the flakes is accomplished by positioning the baffles 40 in closely spaced parallel relation, the baffles being spaced apart sufficiently that the flakes may fall between the baffles, with each flake being oriented with its major plane in horizontal relation, but with the baffles 40 positioned sufficiently close together that the elongated flakes are held in closely spaced parallel relation.

Means are also provided for supporting the vertical baffles 40 in such parallel relation. In the illustrated construction, the means for supporting includes a plurality of rigid frames 28, 44 and 46 supported above the supporting surface 12, the frames 28, 44 and 46 each being rectangular and each including a central rectangular opening.

In the illustrated arrangement, the frame 28 forms an outer frame including a pair of side members 48 rigidly joined together by a pair of transverse end members 50. The side members 48 extend parallel to the longitudinal direction of the supporting surface 12 and parallel to the tracks 26.

The intermediate baffle support frame 44 is housed within the rectangular opening defined by the outer frame 28 and is adapted to be movable therein in reciprocable relation as will be described. The intermediate baffle support frame 44 includes a pair of longitudinally extending side frame members 54 and a pair of transverse end members 56 fixed at their opposite ends to the opposite ends of the longitudinally extending members 54 so as to form a rigid rectangular structure.

The inner frame 46 is housed in the rectangular opening defined by the intermediate baffle frame 44 and is supported therein for reciprocal movement in the direction parallel to the longitudinal direction of the supporting surface 12. The inner frame 46 includes a pair of longitudinally extending side members 58 adapted to be positioned closely adjacent to and parallel to the longitudinally extending side walls 54 of the intermediate frame 44. The inner frame 46 also includes end members 60 joined to the ends of the side members 58 and thereby forming a rigid rectangular structure including a central rectangular opening. The baffles 40 are housed in that opening and are spaced apart across its width.

Figure 2:
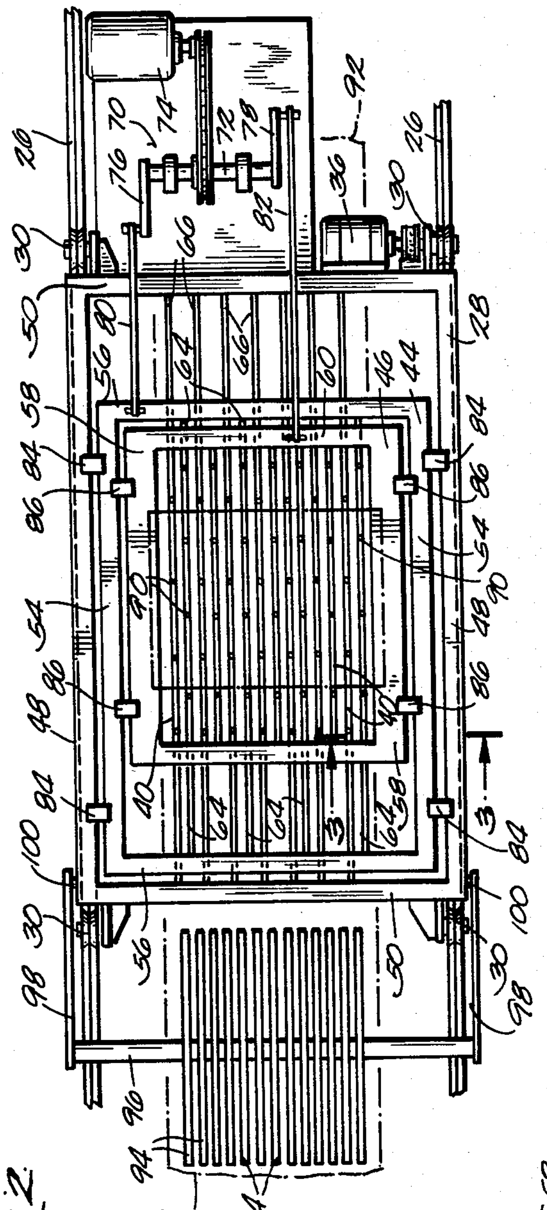
FIG. 2 is a plan view of the apparatus illustrated in FIG. 1 and with portions removed in the interest of clarity.
Figure 3:
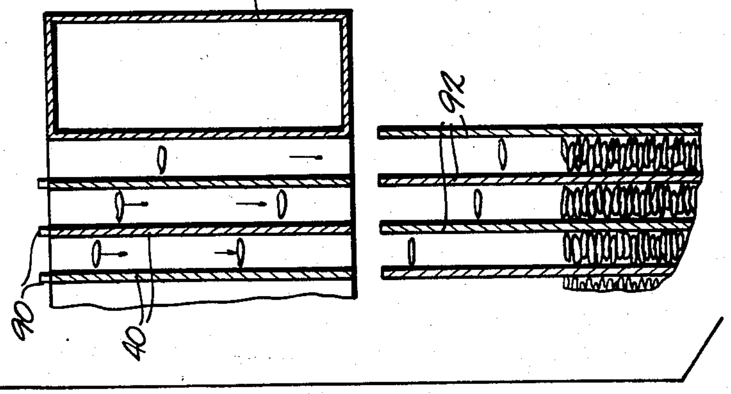
FIG. 3 is a cross section view taken along line 3—3 in FIG. 2.

As illustrated in FIG. 2, one set of the baffles 40 are rigidly joined at their opposite ends to the end walls 60 of the inner frame 46. These baffles are separated by another set of baffles rigidly joined to the end walls 56 of the frame 44. These baffles supported by ends walls 56 are supported by rods 64 which extend through bores in the end walls 60 and which are fixed to the end walls 56 of the frame 44. A third set of the baffles 40 separate the baffles of the first and second sets and are supported by rods 66 which extend slideably through aligned bores in the end walls 60 and 56 and which are fixedly joined to the end walls 50 of the frame 28.

During operation of the apparatus illustrated in the drawings, as elongated wood flakes are dropped from the former 14, some of the flakes fall between the baffles 40, but many of the flakes fall across the baffles, each of those flakes having one end supported on one baffle and an opposite end supported on an adjacent baffle. Accordingly, means are provided by the invention for causing the flakes which fall across the baffles 40 to become aligned with the baffles and to fall therebetween onto the mat 10. In the illustrated construction, this means includes means for causing reciprocal movement of selected ones of the baffles 40 in one direction while causing linear reciprocal movement of adjacent selected baffles 40 in an opposite direction. In the illustrated construction, this means comprises a means for causing reciprocal movement of the intermediate baffle support frame 44 with respect to the outer baffle support frame 28 and means for causing reciprocal movement of the inner baffle support frame 46 with respect to both the intermediate baffle support 44 frame and the outer baffle support frame 28. This means for causing reciprocal movement of the frames includes a crank assembly 70 including a shaft 72 rotatably driven by a motor 74. The shaft 72 of the crank assembly includes opposite ends, a first crank arm 76 being fixed to one of these opposite ends of the shaft and a second crank arm 78 being fixed to the other of the opposite ends of the shaft 72, the second crank arm 78 being positioned at an angle of approximately 180° with respect to the first crank arm 76. The first crank arm 76 includes a free end connected to the intermediate frame 44 by a connecting rod 80. This connecting rod 80 is pivotably connected at one of its ends to the intermediate frame 44 and pivotably connected at an opposite end to the free end of the first crank 76. The other crank 78 is similarly connected by a connecting rod 82 to the inner frame 46, that connecting rod 82 including one end pivotably connected to the end member 60 of the inner frame 46 and an opposite end pivotably connected to the free end of the second crank arm 78.

Means are also provided for supporting the intermediate baffle support frame 44 for reciprocal slideable movement with respect to the outer baffle support frame 28. In the illustrated construction, this means comprises a plurality of flanges 84 fixed to the sides 54 of the intermediate support frame 44 and extending outwardly. The flanges 84 include outer ends resting on the upper surfaces of the side channels 48 of the outer support frame 28. The side channels 48 include smooth upper surfaces and the ends of the flanges 84 include bearings adapted to rest on these upper surfaces of the side channels to support the intermediate frame 44 for slidable movement on the outer frame 28.

Similar means are provided for supporting the inner baffle support frame 46 for movement with respect to the intermediate baffle support frame 44. This means includes a plurality of flanges 86 extending outwardly from the elongated sides 58 of the inner baffle frame 46, these flanges 86 including outer ends adapted to rest on the upper surfaces of the elongated side members 54 of the intermediate baffle support frame 44. The lower portions of these flanges 86 comprise bearings adapted to slidably engage the upper surfaces of the side members 54 to support the inner baffle support frame 46 for slidable movement thereon.

During operation of the apparatus illustrated in the drawings, as the former 14 moves in reciprocal and linear relation back and forth along the length of the mat 10 depositing wood flakes to build up a mat having the desired thickness, some of the wood flakes from the former 14 will fall between the baffles 40. Others of the wood flakes will be oriented at an angle to the baffles 40 and will lie across at least two of the baffles. The reciprocation of the baffles 40 with respect to each other causes these flakes to be turned sufficiently that they become aligned with the elongated narrow openings between the baffles and the flakes can then fall between baffles onto the mat. The means for causing the flakes to be oriented parallel to the baffles 40 also includes a plurality of projections 90 spaced apart along the lengths of selected ones of the baffles 40 and extending upwardly from the upper edges of these baffles 40. During the reciprocation of the baffles, the upwardly extending projections or pins 90 will engage the flakes lying across the baffles and cause those flakes to rotate until they are aligned with the openings between the baffles.

Means are further provided in the illustrated construction for maintaining parallel alignment of the flakes as they fall onto the supporting surface 12. This means includes a plurality of elongated stationary baffles 92 positioned between the baffles 40 and the supporting surface 12. The stationary baffles 92, like baffles 40 are comprised of thin planar members and each include a lower edge adjacent the supporting surface 12 and an upper edge immediately below the lower edges of the baffles 40. In the preferred form of the invention the baffles 92 are supported in coplanar relation with respective ones of baffles 40.

Means are also provided for precompressing the loosely felted mat 10 as it is being formed and as the former 14 and the flake aligning device reciprocate back and forth over the supporting surface 12. This means for precompressing includes mat compression rollers 94 adapted to roll along the length of the mat 10 with the frame 28. The rollers 94 are positioned between respective ones of the baffles 92 and each have a width closely approximating the gap between respective ones of the baffles 92. The rollers 94 are supported on a central shaft or axle 96, that shaft or axle 96 having a horizontal axis perpendicular to the direction of movement of the former 14 and flake aligner. The rollers are supported for rotation about the axle 96, and the axle is connected by arms 98 to one end of the outer baffle support frame 28. The arms 98 are pivotably connected to the end of the outer baffle support frame 28 by pins 100 which allow vertical movement of the rollers 94 with respect to the outer baffle support frame 28 and with respect to the supporting surface 12. This accommodates build up of the thickness of the mat and permits the rollers 94 to ride on the mat as the mat thickness increases.

Various features of the invention are set forth in the following claims.

I claim:

1. Apparatus for forming a loosely felted mat of elongated wood flakes, the mat having a longitudinal direction, and the wood flakes being aligned in parallel relation and parallel to the longitudinal direction of the mat, said apparatus comprising:

means defining a support surface for supporting the loosely felted mat of wood flakes, means for depositing wood flakes on said support surface in a uniformly dispersed, loosely felted relation, said means for depositing being positioned above said support surface, means for aligning said elongated wood flakes in mutually parallel alignment as said wood flakes are deposited on said support surface, said aligning means being positioned between said support surface and said depositing means, and said aligning means including a first set of planar baffles, means for supporting said baffles of said first set in spaced parallel relation and defining vertical planes, a second set of planar baffles, means for supporting said baffles of said second set in spaced parallel relation and defining vertical planes and with respective ones of said second set of baffles being positioned between respective ones of said baffles of said first set, and means for causing reciprocal movement of said baffles of said second set in a direction parallel to the planes defined by said baffles, means for maintaining the parallel alignment of the wood flakes deposited on said support surface, said maintaining means including a lower set of space parallel baffles defining vertical planes and positioned beneath said baffles of said first and second sets, said baffles of said lower set having upper edges adjacent the lower edges of and coplanar with said baffles of said first and second sets of baffles, and said baffles of said lower set having lower edges closely adjacent said support surface, and a mat compression roller attached to said means for aligning, said roller including a plurality of spaced parallel discs extending between pairs of adjacent baffles of said lower set of baffles, and each of said discs being adapted to roll along said mat to compress the wood flakes of the mat.

2. An apparatus as set forth in claim 1 wherein said baffles of said first and second sets include upper edges, and wherein said means for aligning further includes means for causing flakes falling onto said upper edges of said baffles of said first and second sets to be aligned substantially parallel to said baffles and to fall between said baffles.

3. Apparatus as set forth in claim 2 wherein said means for causing said flakes to be aligned substantially parallel to said baffles includes a plurality of projections integrally joined to said upper edges of said baffles and extending upwardly therefrom, said projections being spaced apart along the length of said baffles.

* * * * *